US011836250B2

(12) United States Patent
Grossman et al.

(10) Patent No.: US 11,836,250 B2
(45) Date of Patent: Dec. 5, 2023

(54) IDENTIFICATION AND MITIGATION OF PERMISSIONS ELEVATING ATTACK VECTOR

(71) Applicant: MICROSOFT TECHNOLOGY LICENSING, LLC, Redmond, WA (US)

(72) Inventors: Ilay Grossman, Tel Aviv (IL); Ram Haim Pliskin, Rishon Iezion (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 147 days.

(21) Appl. No.: 17/213,111

(22) Filed: Mar. 25, 2021

(65) Prior Publication Data

US 2022/0309156 A1    Sep. 29, 2022

(51) Int. Cl.
*G06F 21/55* (2013.01)

(52) U.S. Cl.
CPC ...... *G06F 21/554* (2013.01); *G06F 2221/034* (2013.01)

(58) Field of Classification Search
CPC .......... G06F 21/554; G06F 2221/034
See application file for complete search history.

(56) References Cited

U.S. PATENT DOCUMENTS

| 9,081,602 B1* | 7/2015 | Omelyanchuk ..... G06F 9/45545 |
| 2017/0076092 A1* | 3/2017 | Kashyap ............... G06F 21/316 |

(Continued)

FOREIGN PATENT DOCUMENTS

EP    3660713 A1    6/2020

OTHER PUBLICATIONS

Hausknecht, Ryan, "Defense and Detection for Attacks Within Azure", Retrieved from: https://posts.specterops.io/detecting-attacks-within-azure-bdc40f8c0766, Feb. 4, 2020, p. 1-12 (Year: 2020).*

(Continued)

*Primary Examiner* — Chau Le
*Assistant Examiner* — Zhe Liu
(74) *Attorney, Agent, or Firm* — Newport IP, LLC; Jacob P. Rohwer

(57) ABSTRACT

Mitigation of attack vectors that persist elevated permissions within a computing environment. Mitigated attack vectors may be configured to respond to a trigger by generating computing resources with a built-in vulnerability. Mitigated attack vectors may elevate permissions of the computing resources to some heightened level which the malicious actor had previously gained. For example, if the malicious actor had breached a user account having administrator privileges, the attack vector may respond to the trigger by creating the virtual machine and then linking the virtual machine to a service principal having the administrator-level permissions. Left unmitigated the attack vector would enable the malicious actor to regain "administrator-level" privileges even after access to the user account is halted. The disclosed techniques facilitate identifying and preventing the execution of attack vectors having these characteristics to prevent malicious actors from being able to persist previously obtained heightened privileges which have since been revoked.

20 Claims, 7 Drawing Sheets

(56) References Cited

U.S. PATENT DOCUMENTS

| | | | | |
|---|---|---|---|---|
| 2018/0189190 A1* | 7/2018 | Kaplan | ............... | G06F 9/45545 |
| 2019/0253453 A1* | 8/2019 | Vissamsetty | ............ | H04L 63/20 |
| 2019/0334928 A1* | 10/2019 | Sela | ..................... | H04L 63/145 |
| 2020/0092294 A1* | 3/2020 | Sharma | ................ | H04L 63/108 |
| 2021/0073406 A1* | 3/2021 | Stoler | ................ | G06F 11/0772 |
| 2021/0336971 A1* | 10/2021 | Robbins | ............... | G06F 16/212 |

OTHER PUBLICATIONS

Chen, Mike, "Public preview of new Azure Policy features", Retrieved from: https://azure.microsoft.com/en-us/blog/recap-on-new-azure-policy-features-in-ignite/, Nov. 20, 2017, p. 1-6 (Year: 2017).*

Mollema, Dirk-jan, "Azure AD privilege escalation—Taking over default application permissions as Application Admin", Retrieved from https://dirkjanm.io/azure-ad-privilege-escalation-application-admin/, Sep. 16, 2019, p. 1-7 (Year: 2019).*

Hausknecht, Ryan, "Attacking Azure, Azure AD, and Introducing PowerZure", Retrieved from: https://posts.specterops.io/attacking-azure-azure-ad-and-introducing-powerzure-ca70b330511a, Jan. 28, 2020, p. 1-22 (Year: 2020).*

Mollema, Dirk-jan, "I'm in your cloud . . . reading everyone's email—Hacking Azure AD via Active Directory", Retrieved from https://dirkjanm.io/assets/raw/TR19-Im%20in%20your%20cloud.pdf, Mar. 20, 2019, p. 1-90 (Year: 2019).*

Hausknecht, Ryan, "Attacking Azure & Azure AD, Part II", Retrieved from: https://posts.specterops.io/attacking-azure-azure-ad-part-ii-5f336f36697d, Aug. 20, 2020, p. 1-24 (Year: 2020).*

Fosaaen, Karl, "Maintaining Azure Persistence via Automation Accounts", Retrieved from: https://www.netspi.com/blog/technical/cloud-penetration-testing/maintaining-azure-persistence-via-automation-accounts/, Sep. 12, 2019, 17 Pages.

"International Search Report & Written Opinion issued in PCT Application No. PCT/US22/020101", dated Jun. 10, 2022, 12 Pages.

* cited by examiner

IDENTIFICATION AND MITIGATION OF PERMISSIONS ELEVATING ATTACK VECTOR

BACKGROUND

Achieving computer security is important to business enterprises that provision internet-based services to expansive networks of client devices and user accounts. As business enterprises increase the volume of sensitive data and services that are accessible to employees online, the sophistication level of malicious attack vectors that are designed to covertly gain access to these sensitive data and services also increases. Some attack vectors enable malicious actors to gain access to computing resources such as user accounts and/or service principals which have elevated permissions within a business enterprise's computing environment. Security Information and Event Management (SIEM) tools run predefined queries to identify security incidents in which a malicious actor has gained access to a user account and/or service principal. Upon such a security incident being identified, remedial actions are then performed to prevent the malicious actor from further accessing the user account and/or service principal associated with the security incident.

Malicious actors sometimes attempt to alter an enterprise's computing environment in some manner that will enable them to regain certain accesses upon being discovered and having other accesses restricted. For example, a malicious actor that has gained access to a user account having permissions that are elevated to an administrator level and may utilize these permissions to create other user accounts and/or service principals. Thus, even after remedial actions prevent the malicious actor from further accessing the user account having administrator level permissions, the user accounts and/or service principals created by the malicious actor may serve as a backdoor through which the malicious actor may still enter the enterprise's computing environment.

It is with respect to these and other considerations that the disclosure made herein is presented.

SUMMARY

The techniques disclosed herein enable systems to identify and mitigate attack vectors that are designed to persist elevated permissions within a computing environment. Generally described, the identified and mitigated attack vectors may be configured to respond to a trigger event by generating, within the computing environment, a computing resource that is accessible in some manner that is known to a malicious actor. For example, an attack vector may generate a computing resource (e.g., a virtual machine, etc.) that is accessible based on predefined credentials that are prescribed by a malicious actor (e.g., a hacker may hardcode the credentials into the computing resource). Upon generating the computing resource, the attack vector may further elevate permissions of the computing resources to some heightened level which the malicious actor had previously gained within the computing environment. For example, under circumstances in which the malicious actor had previously gained access to a user account having heightened "administrator-level" privileges, the attack vector may respond to the trigger event by creating the new computing resource and then elevating the permissions thereof to the heightened "administrator-level." For example, the attack vector may be configured to link the computing resource (e.g., the virtual machine) to a service principal having the heightened "administrator-level" within the computing environment. In this way, left unmitigated the attack vector would enable the malicious actor to regain "administrator-level" privileges within the computing environment even after further access to the user account is halted (e.g., by changing a password of the user account). The presently disclosed techniques relate to identifying and preventing the execution of sophisticated attack vectors having the forgoing characteristics in order to prevent malicious actors from being able to persist previously obtained heightened privileges which have since been revoked.

In an exemplary embodiment, an enterprise computing environment includes a computing resource having some heightened level of privileges. An exemplary such computing resource may be a user account or subscription having "administrator-level" privileges. The enterprise computing environment further includes a vector detection module that is configured to perform one or more predefined action(s) in response to detecting an attack vector as described below. For example, upon detecting the attack vector, the vector detection module may automatically mitigate the associated risk by decommissioning one or more computing resources and/or service principals that are associated with the attack vector within the enterprise computing environment. Additionally, or alternatively, the vector detection module may transmit an alert to an enterprise entity (e.g., a security analyst).

Detecting the attack vector may include identifying one or more service principals that are configured to generate, within the enterprise computing environment, an externally accessible computing resource and furthermore to elevate privileges corresponding to this computing resource. In some embodiments, the vector detection module may be configured to identify a service principal tied to a policy definition that is designed to instantiate a computing resource having a first permissions level (that is lower than "administrator-level" privileges) in response to some trigger event. For example, the vector detection module may identify a service principal that is tied to a policy definition configured to cause generation of a virtual machine based on a resource template in response to a "false" result of an existence condition associated with the virtual machine. As a specific example, the vector detection module may identify a service principal that is tied to a "DeployIfNotExist" policy definition as provided by Microsoft® Azure®.

The vector detection module may further determine whether the service principal includes instructions or rules to associate (e.g., link) the computing resource having the first permissions level with another service principal that is assigned a second permissions level that is higher than the first permissions level. For example, under circumstances where the identified policy definition is configured to implement a DeployIfNotExist operation to instantiate a virtual machine having low-level "standard user" privileges, the vector detection module may further determine whether the service principal is further configured to link this virtual machine to a managed identity (e.g., the other service principal in this example) having "administrator-level" privileges that are relatively higher than the low-level "standard user" privileges assigned to the virtual machine. Thus, the vector detection module may identify circumstances where a service principal is configured to generate a computing resource with low-level permissions and to effectively elevate these low-level permissions by connecting the computing resource to another service principal having relatively higher permissions.

In some embodiments, the vector detection module may further determine whether the trigger event(s) which may cause the service principal to generate the computing resource with low-level permission and to effectively elevate these permissions are dependent on heightened permissions. One example of such a trigger event that is not dependent on heightened permissions may correspond to an automation task that can be triggered via a webhook. For example, yet another service principal may be configured to respond to a user accessing a predefined URL by performing an automation task that serves as the trigger event. Notably, the service principal which performs this automation task may potentially lack the high-level permissions of the service principal which generates the new computing resource (which may have a built-in vulnerability) and then elevates permissions thereof (e.g., by linking the new computing resource to a highly privileged service principal within the computing environment).

Thus, left unmitigated the attack vector would enable a malicious actor to externally trigger a first service principal to perform an automation task (e.g., the trigger event) in response to the malicious actor merely accessing some predefined URL. The automation task would then cause a second service principal to generate the new computing resource (e.g., the virtual machine) which has hard-coded credentials that are known to the malicious actor. For example, the malicious actor may have previously gained unauthorized access to a user account having heightened "administrator-level" privileges and (via this user account) generated each of the first service principal configured to perform the automation task and the second service principal configured to respond to the automation task by generating the new computing resource and elevating the permissions thereof (e.g., by linking the new computing resource to a third service principal that is also assigned the heightened "administrator-level" privileges. In this way, if the attack vector remains unrecognized and unmitigated, even if the malicious actor's access to the user account having heightened "administrator-level" privileges is cut off (e.g., by changing a password for this user account), the malicious actor would be able to regain these heightened "administrator-level" privileges via the new computing resource that is created by the second service principal in response to the trigger event(s).

In some embodiments, upon identifying the attack vector described above, the vector detection module may mitigate the attack vector by decommissioning the one or more service principals that are identified in association with the attack vector. For example, when the attack vector is identified, one or both of the first service principal and the second service principal described above may be decommissioned. In this way, the techniques described herein prevent the computing environment from generating the new computing resource with the built-in vulnerability and/or elevating the permissions thereof (e.g., by linking the new computing resource having low-level permission to the third service principal having the high-level permissions). Thus, the malicious actor that generated the attack vector will be prevented from exploiting the attack vector to regain whatever heightened-level privileges have previously been cut-off.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

The following Detailed Description discloses technologies that identify and mitigate attack vectors that are placed within a computing environment to enable a malicious actor to regain elevated permissions within the computing environment even after having access revoked from a computing resource such as an administrator account. An exemplary such attack vector may be designed to respond to a trigger event by generating, within the computing environment, a new computing resource that is accessible in some manner that is known to a malicious actor. For example, an attack vector may generate a virtual machine that is accessible based on predefined credentials that are hardcoded into a template by the malicious actor (also referred to herein as a "malicious entity." Upon generating the virtual machine, the attack vector may further elevate permissions of the virtual machine to some heightened level which the malicious actor had previously gained within the computing environment. For example, suppose that the malicious actor had previously gained access to a user account having heightened "administrator-level" privileges. In this case, the attack vector may respond to the trigger event by creating the new virtual machine and then elevating the permissions thereof to the heightened "administrator-level." One manner in which the attack vector may be designed to elevate the permissions of the virtual machine may include linking the virtual machine to a service principal having the heightened "administrator-level." In this way, left unmitigated the attack vector would enable the malicious actor to regain "administrator-level" privileges within the computing environment even after further access to the user account is halted (e.g., by changing a password of the user account). The presently disclosed techniques relate to identifying and preventing the execution of sophisticated attack vectors having the forgoing characteristics in order to prevent malicious actors from being able to persist previously obtained heightened privileges which have since been revoked.

Various examples, scenarios, and aspects of the disclosed techniques are described below with reference to FIGS. 1-5.

Figure 1:
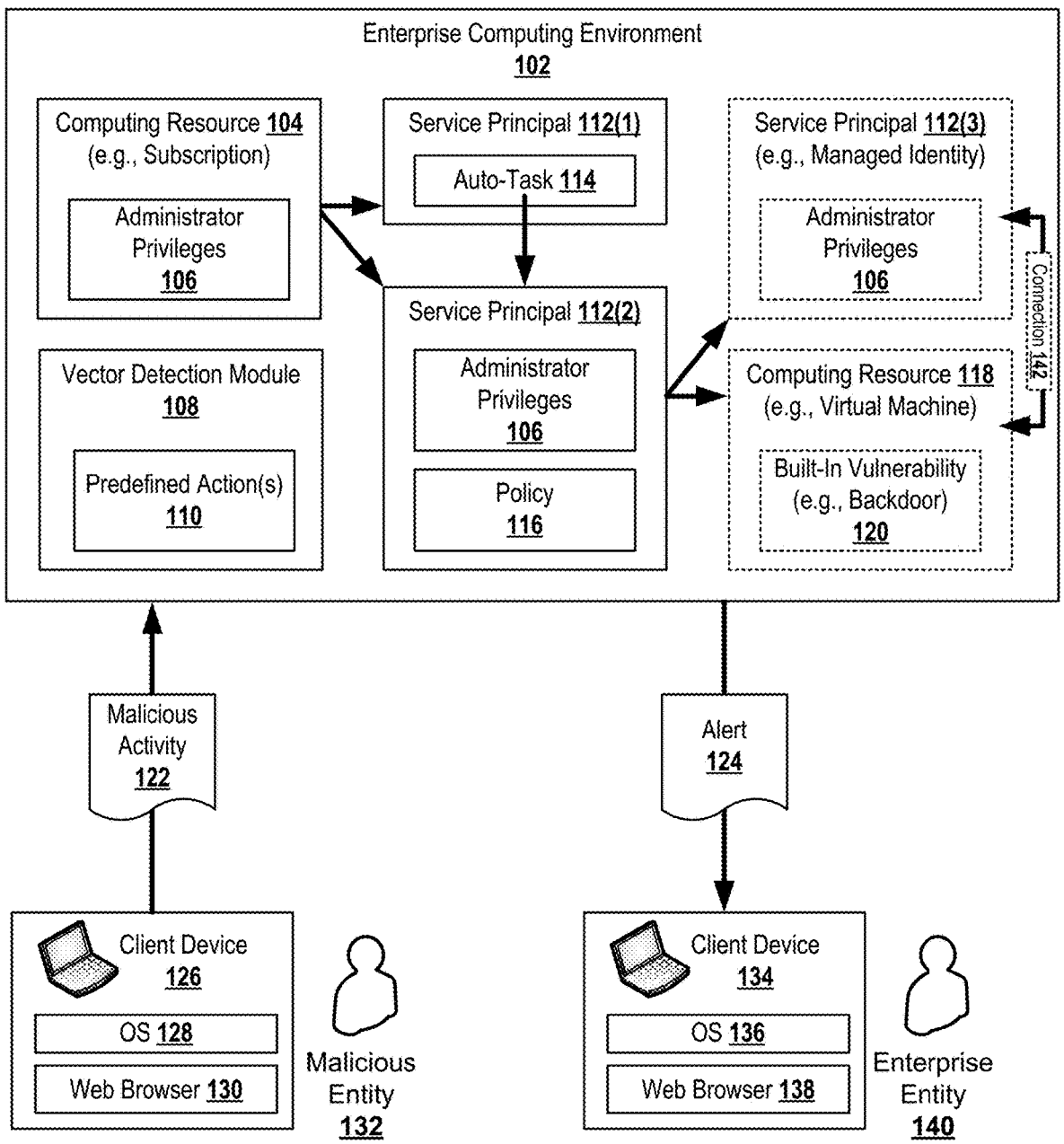
FIG. 1 is a diagram illustrating an example environment in which a vector detection module is configured to mitigate an attack vector that is designed to enable a malicious entity to persist elevated administrator privileges within an enterprise computing environment.

FIG. 1 is a diagram illustrating an example environment 100 in which a vector detection module 108 is configured to mitigate an attack vector that is designed to enable a malicious entity 132 to persist elevated administrator privileges 106 (e.g., a form of heightened permissions) within an enterprise computing environment 102. In this example, the attack vector that is identified and mitigated includes a first service principal 112(1) and a second service principal 112(2) that have been placed in the enterprise computing environment 102 by the malicious entity 132. The first service principal 112(1) and the second service principal 112(2) are configured to respond to trigger event(s) by performing various computing actions that result in the malicious entity 132 regaining the administrator permission 106—even after losing access to the computing resource 104.

As illustrated, the malicious entity 132 may utilize a client device 126 to perform malicious activity 122 with respect to the enterprise computing environment 102. The malicious activity 122 may be performed via a web browser 130 being executed by an operating system 128 of the client device 126. The malicious activity 122 may include gaining unauthorized access to the computing resource 104. The computing resource 104 may be in individual user account, a subscription, or any other suitable computing resource 104 that, upon gaining access thereto, enables an entity (malicious or not) to perform computing actions within the enterprise computing environment 102. In some examples, the computing resource 104 may be a subscription or user account that has been assigned administrator privileges 106. With respect to initially gaining unauthorized access to the computing resource 104, the malicious activity 122 may include a cyberattack that gains access to the computing resource 104 by "cracking" passwords. The cyberattack may include the malicious entity 132 running programs on the client device 126 that implement methods for accessing the computing resource 104. For instance, the malicious entity 132 can use "brute force" attacks to obtain the password for the computing resource 104.

After gaining access to the computing resource 104, the malicious entity 132 can perform various additional malicious activity 122 that utilizes the administrator privileges 106 by way of the computing resource 104. For example, the malicious entity 132 might install malware or other types of malicious software on the breached computing resource 104. Malicious software might, for example, instruct the computing resource 104 to communicate with and execute commands from a network server under the control of the malicious entity 132. In some instances, after gaining unauthorized access to the computing resource 104, the malicious entity 132 might perform a "lateral move" by creating one or more new user accounts within a compromised domain.

Then, even if the malicious entity's access to the computing resource 104 is identified and terminated by a security analyst, the malicious entity 132 may still be able to infiltrate the compromised domain via the newly created user account (e.g., which the domain owner may be temporarily unaware of). However, such "lateral moves" may be easily detected by some a security analyst and even some conventional Security Information and Event Management (STEM) tools. For example, such STEM tools may be programed to run predefined queries to identify user accounts created via an administrator user account during a time period in which that user account is known or suspected to have been compromised.

As compared to a traditional "lateral move" as described above, the attack vector that is identified and mitigated in the present example represents a more subtle and currently unknown approach to persisting unauthorized access to computing resources and even heightened privileges within the enterprise computing environment 102. Here, rather than utilizing the administrator privileges 106 to generate a user accounts, the malicious activity 122 utilizes the administrator privileges 106 to generate a first service principal 112(1) that is configured to perform an automated task 114 in response to some suitable trigger event. For example, the first service principal 112(1) may be configured such that the automation task 114 may be triggered via a webhook. In this way, the malicious entity 132 can cause the first service principal 112(1) to perform the automation task 114 simply by utilizing the web browser 130 to access a predefined URL. As another example, the service principal 112(1) may be configured to perform the automation task 114 based on some predefined schedule. Furthermore, in some cases, the first service principal 112(1) may lack the administrator privileges 106 that are assigned to the computing resource 104.

As further shown in FIG. 1, the malicious activity 122 may further include utilizing the administrator privileges 106 of the breached computing resource 104 to generate a second service principal 112(2) that is tied to a policy 116. In some instances, the policy 116 may include one or more templates from which a new computing resource 118 may be generated. The one or more templates of the policy 116 may further cause the newly created computing resource 118 to include some form of a built-in vulnerability 120. For example, one or more templates may be configured to cause the computing resource 118 to have hard-coded credentials that are known to the malicious entity 132. Upon generation of the computing resource 118, the second service principal 112(2) and/or the newly generated computing resource 118 may be configured to transmit relevant information to the malicious entity. For example, in the event that the computing resource 118 is a virtual machine, the virtual machine may be configured to upon generation transmit its corresponding IP address to the malicious entity 132. Thus, if the second service principal 112(2) were to be successfully caused to generate the computing resource 118, the malicious entity 132 would be able to enter the enterprise computing environment 102 by way of the computing resource 118. In this way, the built-in vulnerability 120 of the computing resource 118 may serve as a "backdoor" into the enterprise computing environment 102. In some instances, the computing resource 118 may lack the administrator privileges 106 that are assigned to the computing resource 104.

In some instances, the second service principal 112(2) may be further configured to effectively elevate the privileges of the computing resource 118 by connecting the computing resource 118 to a third service principal 112(3) to which the administrator privileges 106 are assigned. For example, as illustrated, the malicious activity 122 which caused generation of the second service principal 112(2) has also assigned the administrator privileges 106 to the second service principal 112(2). It will be appreciated that by breaching the computing resource 104 which is assigned the administrator privileges 106, the malicious entity 132 may gain the ability to generate other computing resources (e.g., the first and second service principals) and assign the administrator privileges 106 to those computing resources.

As illustrated, the second service principal 112(2) may be configured to respond to the automation task 114 by generating each of the computing resource 118 (e.g., a virtual machine with hard-coded credentials that are known to the malicious entity 132) and the third service principal 112(3) that is assigned the administrator privileges 106. The second service principal 112(2) may further be configured to establish a connection 142 between the computing resource 118 and the third service principal 112(3). For example, the second service principal 112(2) may be configured: to generate a virtual machine with hard-coded credentials defined by the malicious entity 132, to generate a managed entity and assign it with the administrator privileges 106, and to establish a connection 142 between the virtual machine and the managed identity. Here, if the foregoing operations are successfully triggered and fully performed, then the malicious entity 132 would be able to log into the virtual machine (e.g., via a remote desktop protocol using the hard-coded credentials) and act as the third principal 112(3) via the connection 142. Thus, left unmitigated the foregoing attack vector would enable the malicious entity 132 to regain the administrator privileges 106 within the computing environment 102 even in the event that the unauthorized access to the computing resource 104 is discovered and terminated. Notably, the automation task 114 (which causes the second service principal to carry out the steps of the attack) can be triggered by the malicious entity 132 even without currently having the administrator privileges 106. Accordingly, an object of the presently disclosed techniques is to prevent this type of sophisticated attack vector from being triggered and/or successfully executed.

In order to detect and mitigate the foregoing attack vector, the vector detection module 108 may search the enterprise computing environment 102 for service principals that are configured to establish connections 142 between a computing resource 118 (which might not be in existence at the time of the search) that is not assigned with administrator privileges 106 and to connect the computing resource 118 with a service principal (which also might not be existence at the time of the search) that is assigned with administrator privileges 106. It will be appreciated the vector detection module 108 may conduct this search despite one or both of the computing resource 118 or the to be connected service principal (e.g., the third service principal 112(3) in the present example) being currently non-existent. Stated alternatively, the vector detection module 108 may search for circumstances in which one or more service principals are configured to perform the steps of the attack even if those steps haven't yet been performed.

In some embodiments, the vector detection module 108 may identify a service principal that is tied to a policy definition 116 configured to cause generation of a virtual machine based on a resource template in response to a "false" result of an existence condition associated with the virtual machine. As a specific example, the vector detection module may identify a service principal that is tied to a "DeployIfNotExist" policy definition as provided by Microsoft® Azure®. The vector detection module 108 may further determine whether this service principal is also configured to connect the virtual machine to a computing resource having relatively higher permissions (e.g., the third service principal 112(3)) in response to a trigger event which is not dependent on the relatively higher permissions. In the present example, the vector detection module 108 may recognize that the second service principal 112(2) may be triggered to perform the attack that includes generating and elevating the permissions of the computing resource 118 in response to an automation task 114 that can be kicked off via some user activity which does not occur by way of a heightened privilege computing resource.

For purposes of the present example, presume that the attack vector that is comprised of the first service principal 112(1) and the second service principal 112(2) exists at a first time. That is, at the first time, the malicious entity 132 has already breached the computing resource 104 and has planted the attack vector by generating the first service principal 112(1) and the second service principal 112(2). Further presume that at this first time none of the computing resource 118, the third service principal 112(3), nor the connection 142 have been created. Accordingly, these elements are shown in dashed lines in FIG. 1 to represent what the completed attack would potentially accomplish if left unmitigated. Specifically, left unmitigated the attack vector would enable the malicious entity 132 to externally trigger the first service principal 112(1) to perform the automation task 114 (e.g., the trigger event). The automation task 114 would then cause the second service principal 112(2) to generate the new computing resource 118 (e.g., having the built-in vulnerability) and connect this computing resource 118 to the third service principal 112(3) having the administrator privileges 106. In this way, if the attack vector remains unrecognized and unmitigated, even if the malicious entity's 132 access to the computing resource 104 is cut off, the attack vector would enable the malicious entity 132 to regain these heightened "administrator-level" privileges via the new computing resource 118.

Upon identifying the attack vector described above, the vector detection module 108 may mitigate the attack vector by decommissioning the one or both of the first service principal 112(1) and the second service principal 112(2). Furthermore, the vector detection module 108 may identify that the computing resource 104 was used to generate one or both of the first service principal 112(1) and the second service principal 112(2) and, based thereon, determine that the computing resource 104 has likely been breached. Accordingly, in addition to decommissioning the service principal(s) that are designed to carry out the attack vector, the vector detection module 108 may further perform remedials actions to cut-off unauthorized access to the computing resource 104. For example, the vector detection module 108 may freeze the computing resource 104 and instruct an enterprise entity 140 (e.g., an employee of the enterprise, an owner of the computing resource 104, etc.) to change the access credentials thereto.

In this way, the techniques described herein prevent the enterprise computing environment 102 from generating the new computing resource 118 with the built-in vulnerability 120 and/or elevating the permissions thereof (e.g., by linking the new computing resource having low-level permission to the third service principal 112(3) having the high-level permissions). Thus, the malicious entity 132 that generated the attack vector will be prevented from exploiting the attack vector to regain whatever heightened-level privileges have previously been cut-off.

Figure 2:
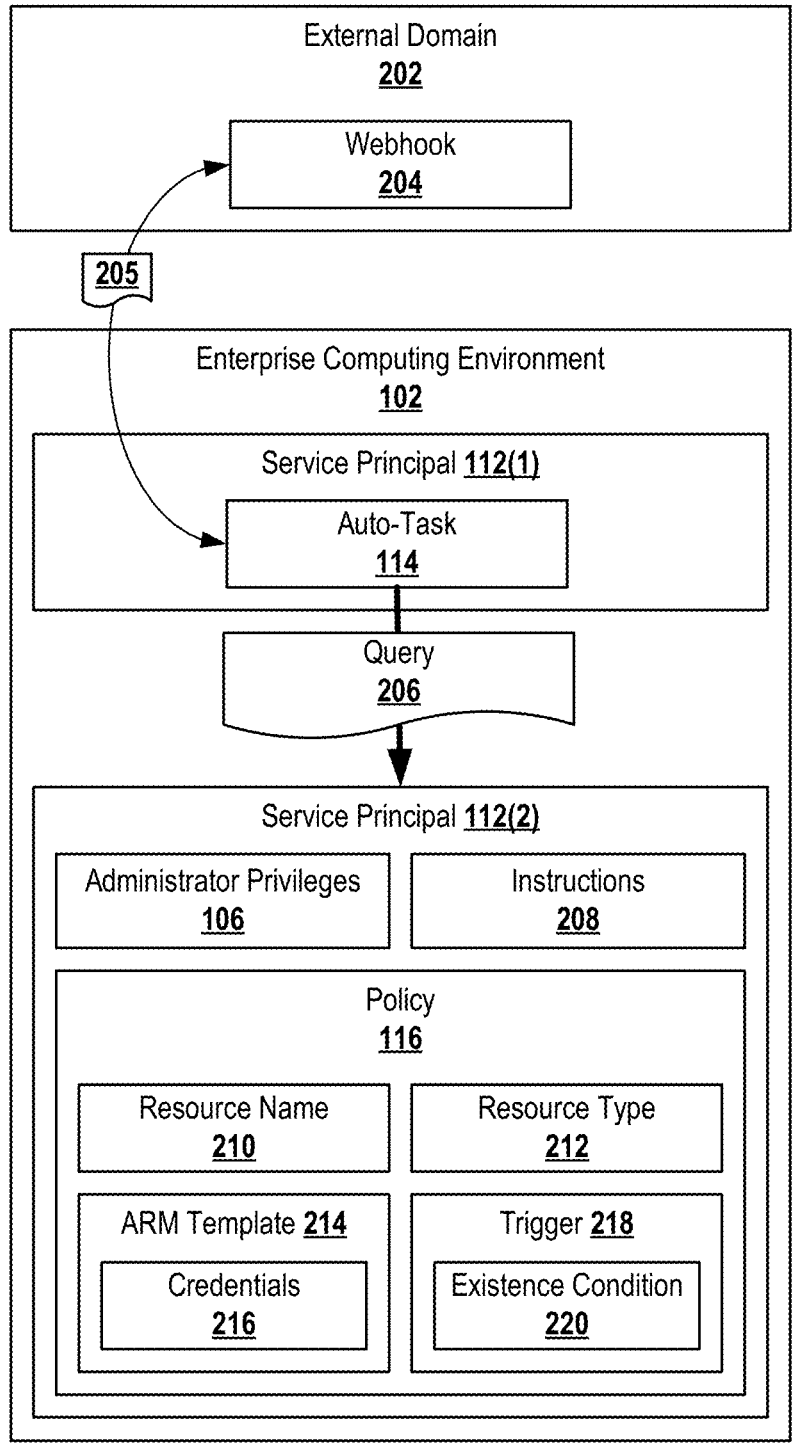
FIG. 2 illustrates characteristics of an exemplary attack vector which the vector detection module may identify and mitigate by performing one or more remedial actions.

Turning now to FIG. 2, illustrated are characteristics of an exemplary attack vector 200 which the vector detection module 108 may identify and mitigate by performing one or more remedial actions. As illustrated, the exemplary attack vector 200 includes one or more service principals 112 that are configured to perform one or more actions in response to activity performed via a webhook 204 that corresponds to an external domain 202. The webhook 204 may be a user-defined HTTP callback that has been generated by a malicious entity. In some embodiments, the webhook 204 may be triggered by the malicious entity visiting the external domain via a web browser. In response to being triggered, the webhook 204 may communicate with the one or more service principals 112 that reside within the enterprise computing environment 102.

In the illustrated example, triggering of the webhook 204 results in one or more communications 205 being transmitted between the external domain 202 and the first service principal 112(1) that resides within the enterprise computing domain 102. The one or more communications may serve as a trigger event that causes the first service principal 112(1) to perform one or more autonomous tasks 114 that have been defined by the malicious entity. In the illustrated example, the autonomous tasks 114 may include transmitting a query 206 (or other form of communication) to a second service principal 112(2) and that causes the second service principal 112(2) to perform one or more actions of the attack vector 200.

In some examples, the query 206 may include a resource name 210 associated with a computing resource that may potentially be exploited by the malicious entity. For example, the second service principal 112(2) may be tied to a policy 116 having some policy definition that is designed by the malicious entity to gain access to the enterprise computing environment 102 and/or to gain elevated permissions within the enterprise computing environment 102. In some instances, the policy 116 may be a Microsoft® Azure® Policy that is designed to have one or more specific effects. In plain terms, a particular effect determines what happens when the policy rule is evaluated to match. Furthermore, the effects may behave differently if they are for a new resource, an updated resource, or an existing resource.

In some instances, the policy 116 may correspond to a "DeployIfNotExist" effect that causes the policy 116 to execute a deployment of an Azure Resource Manager (ARM) template when a condition is met such as, for example, an Existence Condition 220 determined for a resource name 210 evaluating to false. In this way, the query 206 may request information from and/or check a status of the resource name 210 and/or resource type 212. This information request may serve as a trigger 218 that causes the second service principal 112(2) to deploy the template 214. An exemplary template 214 may be a JavaScript Object Notation (JSON) file that defines the infrastructure and configuration for a yet to be created computing resource (e.g., the computing resource 118). Such a template 214 may use declarative syntax that enables an entity to state what is intended to be deployed without having to write the sequence of programming commands at the time the computing resource 118 is created. Stated alternatively, the template 214 may enable a user to specify the resources to deploy and the properties for those resources so that they can be automatically deployed at some future time by the second service principal 112(2) in response to the trigger event 218.

As shown, the template 214 may prescribe credentials 216 for the yet to be created computing resource 118.

In some embodiments, the attack vector 200 may further include instructions 208 that are defined by the malicious entity to cause the permissions associated with the computing resource 118 to be elevated either upon its creation or at some time after its creation. For example, as described in relation to FIG. 1, the instructions 208 may cause the second service principal 112(2) to deploy the ARM template 214 to create a virtual machine having the credentials 216 and the resource name 210. The instructions 208 may further cause the second service principal 112(2) (and/or the yet to be created computing resource) to communicate details associated with the computing resource 118 to the external domain 202 (or otherwise back to the malicious entity) that staged the attack vector 200. An exemplary detail that may be communicated back to the malicious entity regarding a newly created resource may be an IP address associated with a virtual machine. For example, it will be appreciated that an IP address may be assigned to a virtual machine at its time of creation and, therefore, may be unknowable until that time. Accordingly, the instructions 208 may cause the second service principal 112(2) to obtain the IP address that has been assigned to a newly created computing resource 118 and communicate the IP address to the malicious entity. In this way, the malicious entity may have each of the credentials 218 and the newly assigned IP address which may enable the malicious entity to regain previously lost or cut-off access to the enterprise computing environment 102.

In some embodiments, the instructions 208 may be configured to elevate the permissions of the newly created computing resource 118 by connecting it to a service principal 112 that has the desired elevated permissions. For example, the instructions 208 may cause the second service principal 112(2) to connect the computing resource 118 to a third service principal 112(3) that is assigned the desired elevated permissions. In this way, if the attack vector is successfully executed (rather than being disarmed as described herein) the malicious entity would be able to log into the computing resource 118 (e.g., by using a remote desktop protocol to log into the computing resource 118 from some external domain). Then, once logged into the computing resource 118, the malicious entity would be able to perform actions within the enterprise computing environment 102 by way of the third service principal 112(3) that the computing resource 118 has been connected to. Thus, the malicious entity would essentially be bestowed with the elevated permissions of the third service principal 112(3).

As noted in relation to FIG. 1, the vector detection module 108 may be configured to identify the various characteristics associated with the attack vector 200. Then, upon identifying the attack vector 200, the vector detection module 108 may perform remedial actions to disarm the attack vector 200 prior the communication 205 ever serving as the trigger 218 that sets the operations of the attack into motion.

Figure 3A:
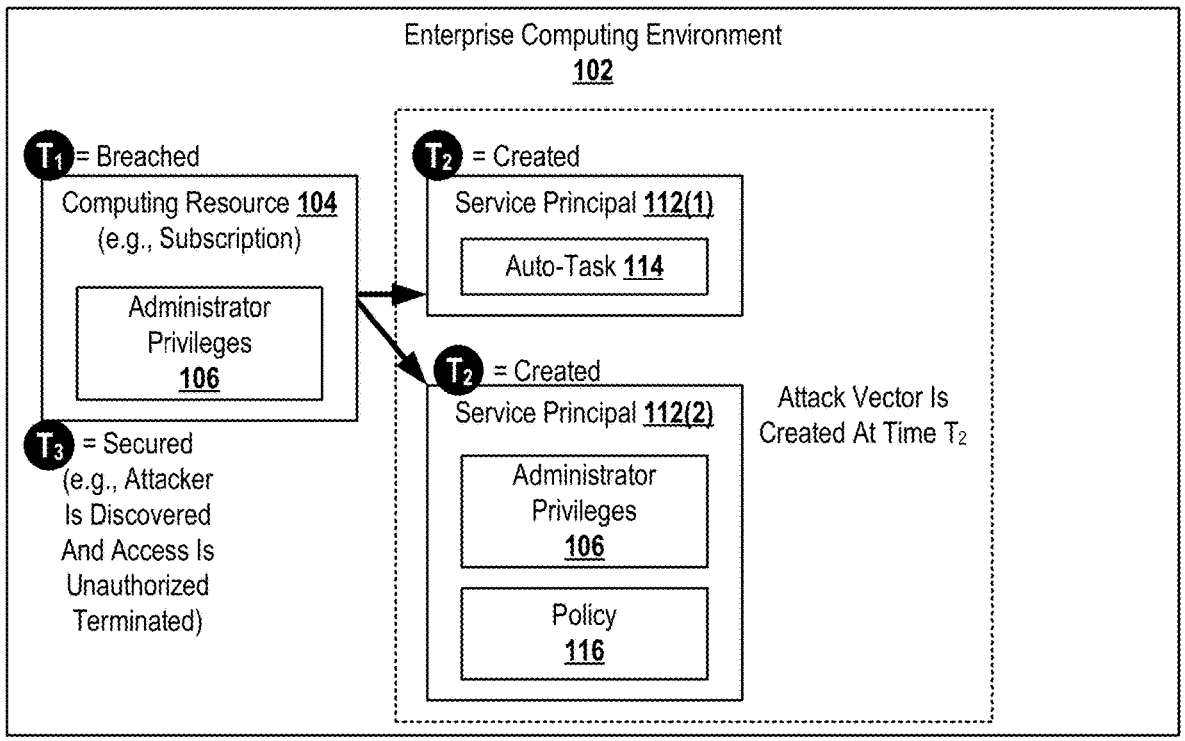
FIG. 3A illustrates an exemplary flow scenario in which an attack vector is created within the enterprise computing environment.
Figure 3B:
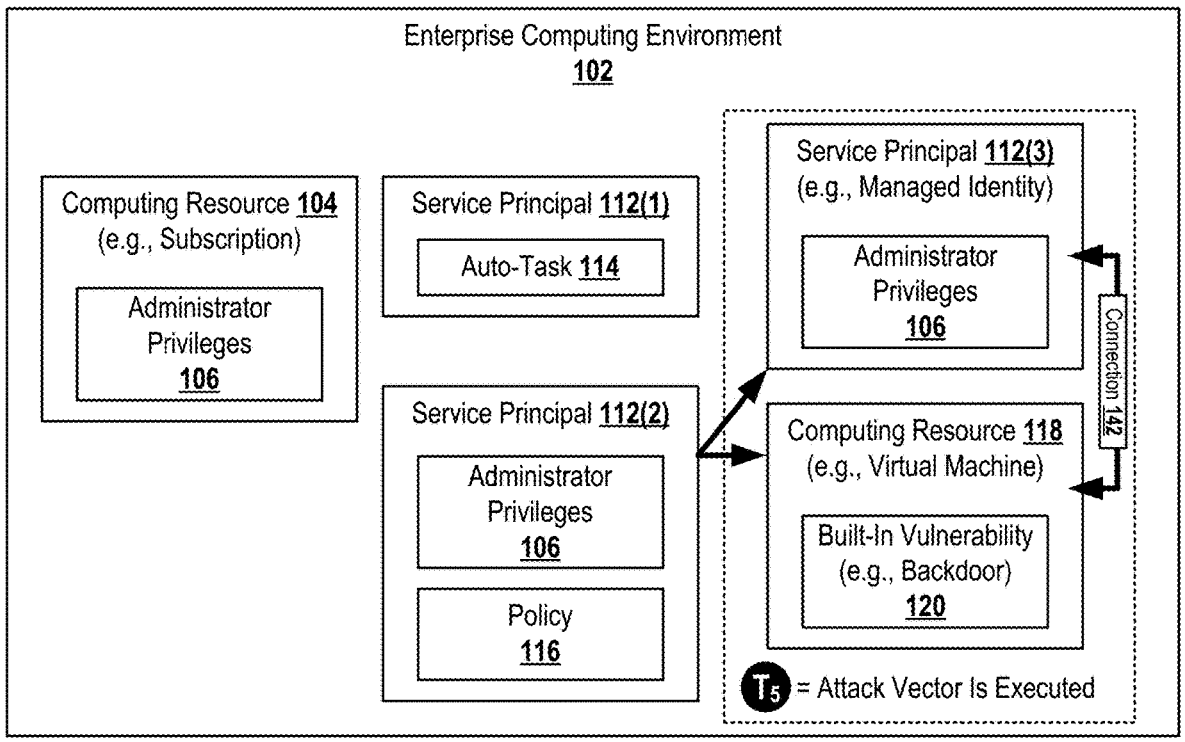
FIG. 3B illustrates an exemplary flow scenario in which the attack vector is successfully executed subsequent to the computing resource being secured.
Figure 3C:
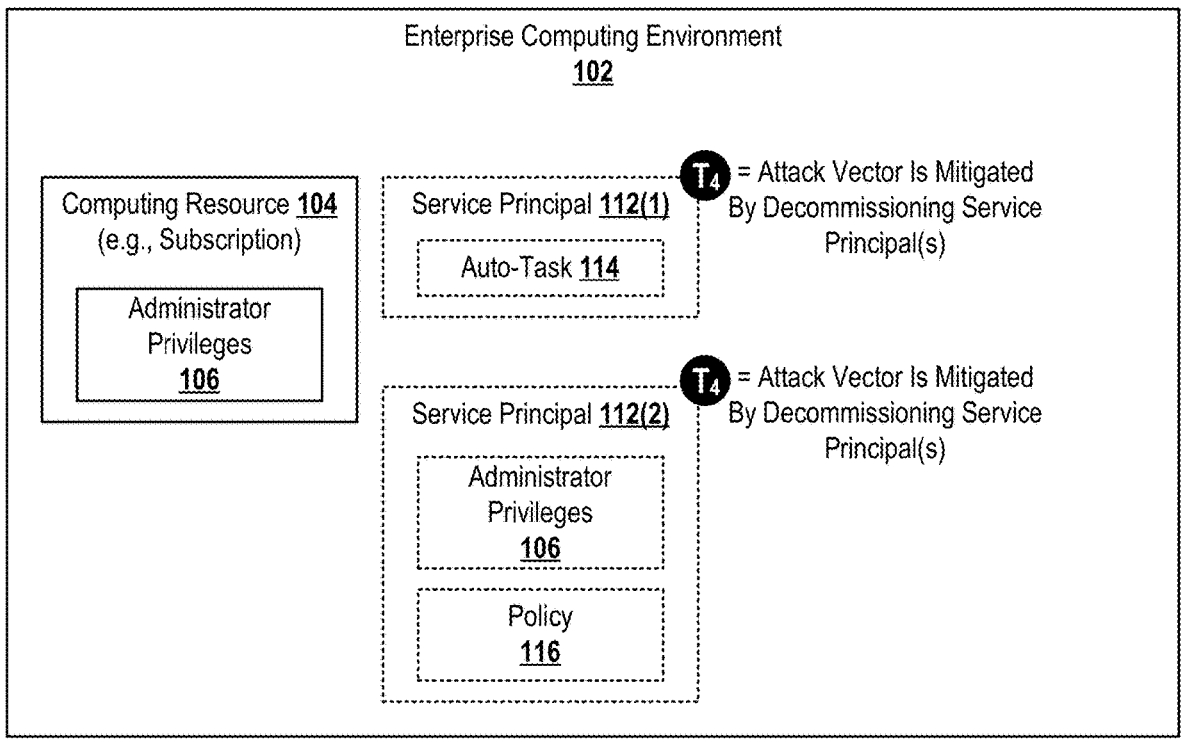
FIG. 3C illustrates an exemplary flow scenario in which the attack vector is successfully mitigated to prevent unauthorized access to the enterprise computing environment.

FIGS. 3A—3C illustrate various temporal flow aspects of an attack vector within the enterprise computing environment 102. It will be appreciated that various computing operations described in relation to FIGS. 3B and 3C may be mutually exclusive in the sense that the operations described in relation to FIG. 3B can be prevented by performing the operations described in relation to FIG. 3C.

Turning now to FIG. 3A, illustrated is an exemplary flow scenario 300 in which an attack vector is created within the enterprise computing environment 102. Specifically, at time $T_1$ a computing resource 104 is breached by a malicious entity. For example, as described above, the malicious entity may perform a brute force of other form of attack that is directed at gaining unauthorized access to the computing resource 104.

At time $T_2$, knowing that the unauthorized access will potentially be discovered and terminated, the malicious entity may create an attack vector within the enterprise computing environment 102. In this example, at time $T_2$ the malicious entity uses the computing resource 104 to create one or more service principals 112 that are designed to persist the unauthorized access to the enterprise computing environment 102 via alternative means (i.e., via some resource other than the already breached computing resource 104). Specifically, the malicious entity creates the first service principal 112(1) and the second service principal 112(2) described above in relation to FIGS. 1 and 2.

Later, at time $T_3$, the computing resource 104 becomes secured. For example, access credentials associated with the computing resource 104 may be changed.

Turning now to FIG. 3B, illustrated is an exemplary flow scenario 310 in which the attack vector is successfully executed subsequent to the computing resource 104 being secured. As illustrated, at time $T_5$ one or both of the first service principal 112(1) or the second service principal 112(2) generate a new computing resource 118 within the enterprise computing environment 102. Furthermore, this new computing resource 118 is given elevated permissions either directly or indirectly. For example, in some instances, the computing resource 118 itself may be assigned with the administrator privileges 106. Additionally, or alternatively, the computing resource 118 may be connected to some other computing resource (e.g., a third service principal 112(3), the second service principal 112(2), etc.) that has the administrator privileges 106 assigned thereto. Furthermore, as shown, the computing resource 118 may have a backdoor built into it that enables the malicious entity to reenter the enterprise computing environment 102 by way of the computing resource 118. In this way, left unmitigated the attack vector would enable the malicious actor to regain "administrator-level" privileges within the computing environment even after further access to the user account is halted (e.g., by changing a password of the user account). It will be appreciated that an object of the techniques disclosed herein is to prevent the operations shown in FIG. 3B from occurring.

Turning now to FIG. 3C, illustrated is an exemplary flow scenario 320 in which the attack vector is successfully mitigated to prevent unauthorized access to the enterprise computing environment 102. As illustrated, at time $T_4$ (which is prior to $T_5$ shown and described in relation to FIG. 3B), one or both of the service principals 112(1) and 112(2) are decommissioned—thereby preventing the operations shown in FIG. 3B from ever occurring.

Figure 4:
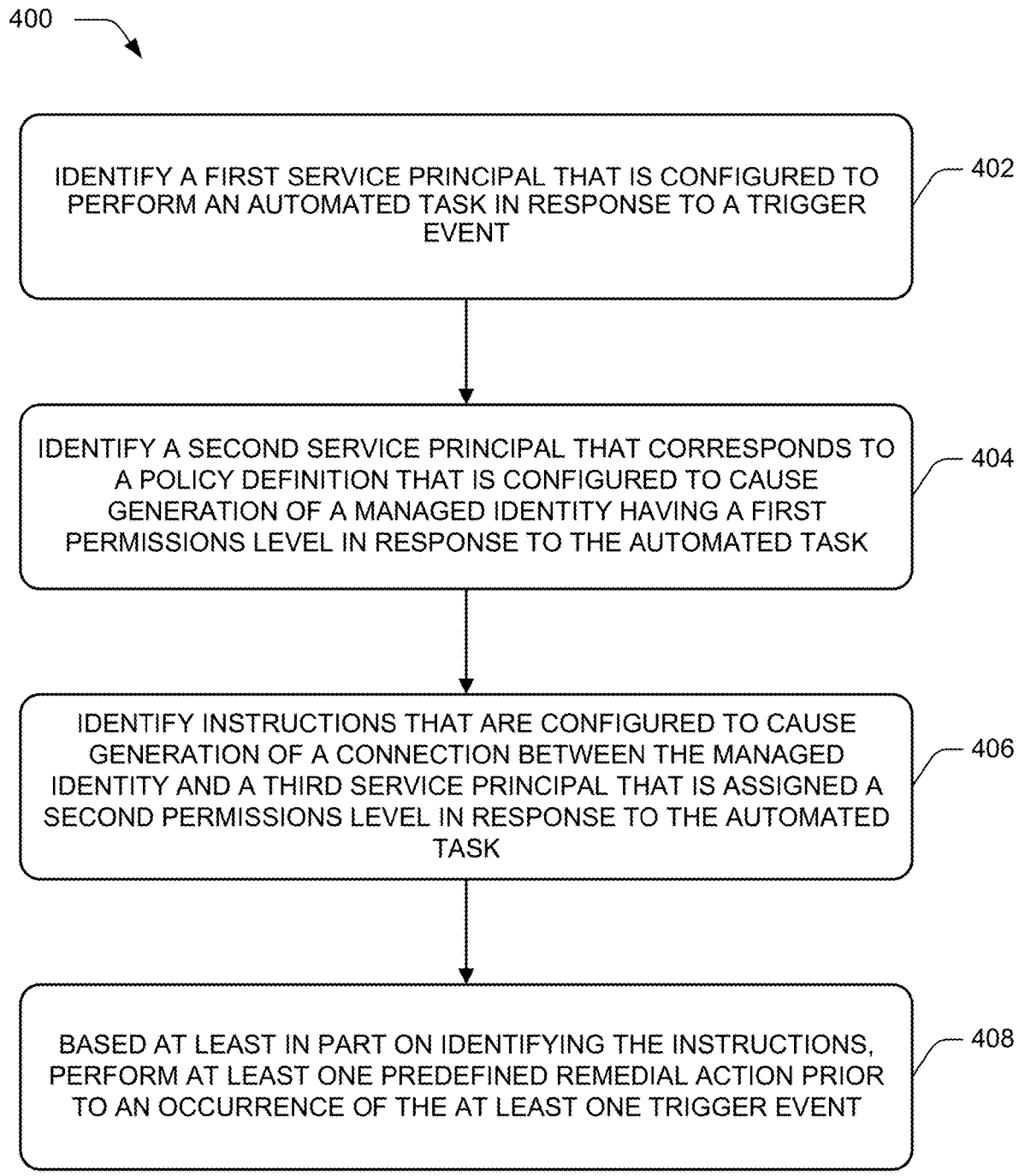
FIG. 4 illustrates a process that facilitates identification and mitigation of an attack vector that is designed to enable a malicious entity to persist elevated privileges within an enterprise computing environment.

Turning now to FIG. 4, a process 400 is describe that facilitates identification and mitigation of an attack vector that is designed to enable a malicious entity to persist elevated privileges within an enterprise computing environment. It should be understood that the operations of the methods disclosed herein are not presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 400 are described herein as being implemented, at least in part, by modules running the features disclosed herein can be a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it can be appreciated that the operations of the routine 400 may be also implemented in many other ways. For example, the routine 400 may be implemented, at least in part, by a processor of another remote computer or a local circuit. In addition, one or more of the operations of the routine 400 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

The process 400 begins at operation 402 where a system identifies a first service principal that is configured to perform an automated task in response to a trigger event. For example, the vector detection module 108 may identify the first service principal 112(1) as shown an described in relation to FIG. 1. In some instances, the first service principal may lack administrator privileges. Furthermore, in some instances, the trigger event may occur based on user activity that occurs externally from an enterprise computing resource within which the first service principal resides. For example, a webhook that is triggered via an external internet domain (e.g., that is outside of the enterprise computing environment) may cause the first service principal to perform the automated task.

At operation 404, the system identifies a second service principal that corresponds to a policy definition that is configured to cause generation of a computing resource having a first permissions level in response to the automated task. For example, the automated task may cause the second service principal to perform a "DeployIfNotExist" effect to generate a virtual machine defined within an ARM template of the policy definition.

At operation 406, the system identifies instructions that are configured to cause generation of a connection between the computing resource and a third service principal that is assigned a second permissions level in response to the automated task. For example, the instructions may be configured to connect the computing resource, having the first permissions, to a managed identity (i.e., a form of service principal) that has second permissions assigned to it that are higher than the first permissions.

At operation 408, the system may perform a remedial action that prevents the trigger event from causing the second service principal to generate the computing resource. In this way, the attack vector becomes disarmed so that even if the trigger event does occur (e.g., if a hacker attempts to set of the attack vector), the remedial action will prevent the attacker from regaining elevated permissions within the enterprise computing environment.

Figure 5:
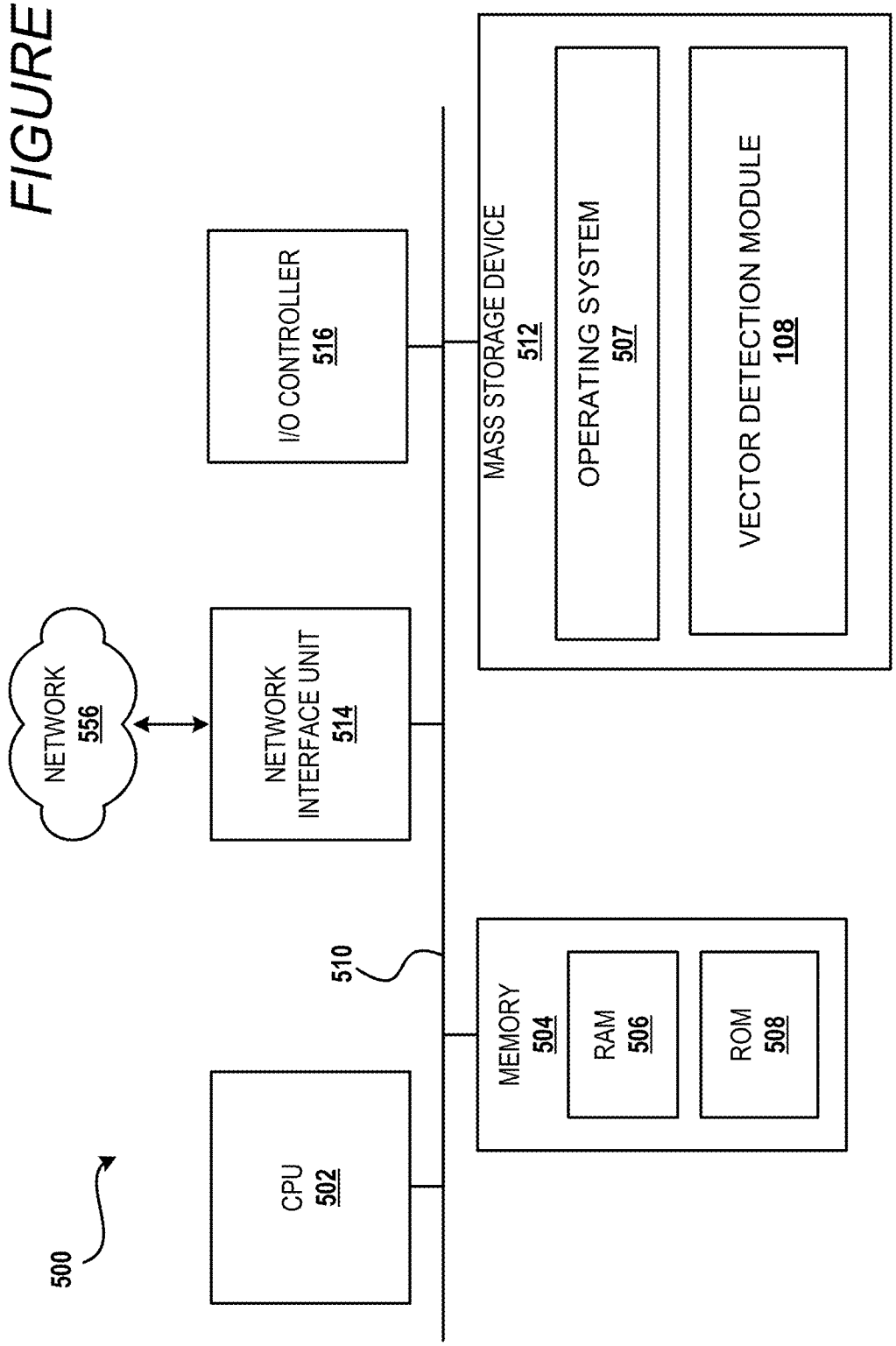
FIG. 5 shows additional details of an example computer architecture for a computer, such as such as a server and/or server cluster, capable of executing the program components described herein.

FIG. 5 shows additional details of an example computer architecture 500 for a computer, such as such as a server and/or server cluster, capable of executing the program components described herein. Thus, the computer architecture 500 illustrated in FIG. 5 illustrates an architecture for a server computer, a mobile phone, a PDA, a smart phone, a desktop computer, a netbook computer, a tablet computer, and/or a laptop computer. The computer architecture 500 may be utilized to execute any aspects of the software components presented herein.

The computer architecture 500 illustrated in FIG. 5 includes a central processing unit 502 ("CPU"), a system memory 504, including a random-access memory 506 ("RAM") and a read-only memory ("ROM") 508, and a system bus 510 that couples the memory 504 to the CPU 502. A basic input/output system containing the basic routines that help to transfer information between elements within the computer architecture 500, such as during startup, is stored in the ROM 508. The computer architecture 500 further includes a mass storage device 512 for storing an operating system 507, other data, and one or more applications, such as the analysis module 129. The mass storage device 512 can also store computer-executable instruction for implementing the Vector Detection Module 108.

The mass storage device 512 is connected to the CPU 502 through a mass storage controller (not shown) connected to the bus 510. The mass storage device 512 and its associated computer-readable media provide non-volatile storage for the computer architecture 500. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computer architecture 500.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 500. For purposes of the claims, the phrase "computer storage medium," "computer-readable storage medium" and variations thereof, does not include waves, signals, and/or other transitory and/or intangible communication media, per se.

According to various configurations, the computer architecture 500 may operate in a networked environment using logical connections to remote computers through the network 556 and/or another network (not shown). The computer architecture 500 may connect to the network 556 through a network interface unit 514 connected to the bus 510. It should be appreciated that the network interface unit 514 also may be utilized to connect to other types of networks and remote computer systems. The computer architecture 500 also may include an input/output controller 516 for receiving and processing input from a number of other devices, including a keyboard, mouse, or electronic stylus (not shown in FIG. 5). Similarly, the input/output controller 516 may provide output to a display screen, a printer, or other type of output device (also not shown in FIG. 5).

It should be appreciated that the software components described herein may, when loaded into the CPU 502 and executed, transform the CPU 502 and the overall computer architecture 500 from a general-purpose computing system into a special-purpose computing system customized to facilitate the functionality presented herein. The CPU 502 may be constructed from any number of transistors or other discrete circuit elements, which may individually or collectively assume any number of states. More specifically, the CPU 502 may operate as a finite-state machine, in response to executable instructions contained within the software modules disclosed herein. These computer-executable instructions may transform the CPU 502 by specifying how the CPU 502 transitions between states, thereby transforming the transistors or other discrete hardware elements constituting the CPU 502.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 500 in order to store and execute the software components presented herein. It also should be appreciated that the computer architecture 500 may include other types of computing devices, including hand-held computers, embedded computer systems, personal digital assistants, and other types of computing devices known to those skilled in the art. It is also contemplated that the computer architecture 500 may not include all of the components shown in FIG. 5, may include other components that are not explicitly shown in FIG. 5, or may utilize an architecture completely different than that shown in FIG. 5.

Turning now to FIG. 6, an illustrative computing device architecture 600 for a computing device that is capable of executing various software components described herein for enabling the techniques disclosed herein. The computing device architecture 600 is applicable to computing devices that facilitate mobile computing due, in part, to form factor, wireless connectivity, and/or battery-powered operation. In some configurations, the computing devices include, but are not limited to, mobile telephones, tablet devices, slate devices, portable video game devices, and the like. The computing device architecture 600 is applicable to any of the computing devices shown in FIG. 1 and FIG. 7. Moreover, aspects of the computing device architecture 600 may be applicable to traditional desktop computers, portable computers (e.g., phones, laptops, notebooks, ultra-portables, and netbooks), server computers, and other computer systems, such as described herein with reference to FIG. 1 and FIG. 7. For example, the single touch and multi-touch aspects disclosed herein below may be applied to desktop computers that utilize a touchscreen or some other touch-enabled device, such as a touch-enabled track pad or touch-enabled mouse.

The computing device architecture 600 illustrated in FIG. 6 includes a processor 602, memory components 804, network connectivity components 606, sensor components 608, input/output components 610, and power components 612. In the illustrated configuration, the processor 602 is in communication with the memory components 604, the network connectivity components 606, the sensor components 608, the input/output ("I/O") components 610, and the power components 612. Although no connections are shown between the individuals components illustrated in FIG. 6, the components can interact to carry out device functions. In some configurations, the components are arranged so as to communicate via one or more busses (not shown).

The processor 602 includes a central processing unit ("CPU") configured to process data, execute computer-executable instructions of one or more application programs, and communicate with other components of the computing device architecture 600 in order to perform various functionality described herein. The processor 602 may be utilized to execute aspects of the software components presented herein and, particularly, those that utilize, at least in part, a touch-enabled input.

In some configurations, the processor 602 includes a graphics processing unit ("GPU") configured to accelerate operations performed by the CPU, including, but not limited to, operations performed by executing general-purpose scientific and/or engineering computing applications, as well as graphics-intensive computing applications such as high resolution video (e.g., 720P, 1080P, and higher resolution), video games, three-dimensional ("3D") modeling applications, and the like. In some configurations, the processor 602 is configured to communicate with a discrete GPU (not shown). In any case, the CPU and GPU may be configured in accordance with a co-processing CPU/GPU computing model, wherein the sequential part of an application executes on the CPU and the computationally intensive part is accelerated by the GPU.

In some configurations, the processor 602 is, or is included in, a system-on-chip ("SoC") along with one or more of the other components described herein below. For example, the SoC may include the processor 602, a GPU, one or more of the network connectivity components 606, and one or more of the sensor components 608. In some configurations, the processor 602 is fabricated, in part, utilizing a package-on-package ("PoP") integrated circuit packaging technique. The processor 602 may be a single core or multi-core processor.

The processor 602 may be created in accordance with an ARM architecture, available for license from ARM HOLDINGS of Cambridge, United Kingdom. Alternatively, the processor 602 may be created in accordance with an x86 architecture, such as is available from INTEL CORPORATION of Mountain View, California and others. In some configurations, the processor 602 is a SNAPDRAGON SoC, available from QUALCOMM of San Diego, California, a TEGRA SoC, available from NVIDIA of Santa Clara, California, a HUMMINGBIRD SoC, available from SAMSUNG of Seoul, South Korea, an Open Multimedia Application Platform ("OMAP") SoC, available from TEXAS INSTRUMENTS of Dallas, Texas, a customized version of any of the above SoCs, or a proprietary SoC.

The memory components 604 include a random access memory ("RAM") 614, a read-only memory ("ROM") 616, an integrated storage memory ("integrated storage") 618, and a removable storage memory ("removable storage") 620. In some configurations, the RAM 614 or a portion thereof, the ROM 616 or a portion thereof, and/or some combination of the RAM 614 and the ROM 616 is integrated in the processor 602. In some configurations, the ROM 616 is configured to store a firmware, an operating system or a portion thereof (e.g., operating system kernel), and/or a bootloader to load an operating system kernel from the integrated storage 618 and/or the removable storage 620.

The integrated storage 618 can include a solid-state memory, a hard disk, or a combination of solid-state memory and a hard disk. The integrated storage 618 may be soldered or otherwise connected to a logic board upon which the processor 602 and other components described herein also may be connected. As such, the integrated storage 618 is integrated in the computing device. The integrated storage 618 is configured to store an operating system or portions thereof, application programs, data, and other software components described herein.

The removable storage 620 can include a solid-state memory, a hard disk, or a combination of solid-state memory and a hard disk. In some configurations, the removable storage 620 is provided in lieu of the integrated storage 618. In other configurations, the removable storage 620 is provided as additional optional storage. In some configurations, the removable storage 620 is logically combined with the integrated storage 618 such that the total available storage is made available as a total combined storage capacity. In some configurations, the total combined capacity of the integrated storage 618 and the removable storage 620 is shown to a user instead of separate storage capacities for the integrated storage 618 and the removable storage 620.

The removable storage 620 is configured to be inserted into a removable storage memory slot (not shown) or other mechanism by which the removable storage 620 is inserted and secured to facilitate a connection over which the removable storage 620 can communicate with other components of the computing device, such as the processor 602. The removable storage 620 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 604 can store an operating system. According to various configurations, the operating system includes, but is not limited to WINDOWS MOBILE OS from Microsoft Corporation of Redmond, Washington, WINDOWS PHONE OS from Microsoft Corporation, WINDOWS from Microsoft Corporation, PALM WEBOS from Hewlett-Packard Company of Palo Alto, California, BLACKBERRY OS from Research In Motion Limited of Waterloo, Ontario, Canada, IOS from Apple Inc. of Cupertino, California, and ANDROID OS from Google Inc. of Mountain View, California Other operating systems are contemplated.

The network connectivity components 606 include a wireless wide area network component ("WWAN component") 622, a wireless local area network component ("WLAN component") 624, and a wireless personal area network component ("WPAN component") 626. The network connectivity components 606 facilitate communications to and from the network 656 or another network, which may be a WWAN, a WLAN, or a WPAN. Although only the network 656 is illustrated, the network connectivity components 606 may facilitate simultaneous communication with multiple networks, including the network 604 of FIG. 6. For example, the network connectivity components 606 may facilitate simultaneous communications with multiple networks via one or more of a WWAN, a WLAN, or a WPAN.

The network 656 may be or may include a WWAN, such as a mobile telecommunications network utilizing one or more mobile telecommunications technologies to provide voice and/or data services to a computing device utilizing the computing device architecture 600 via the WWAN component 622. The mobile telecommunications technologies can include, but are not limited to, Global System for Mobile communications ("GSM"), Code Division Multiple Access ("CDMA") ONE, CDMA7000, Universal Mobile Telecommunications System ("UMTS"), Long Term Evolution ("LTE"), and Worldwide Interoperability for Microwave Access ("WiMAX"). Moreover, the network 656 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 656 may be configured to provide voice and/or data communications with any combination of the above technologies. The network 656 may be configured to or adapted to provide voice and/or data communications in accordance with future generation technologies.

In some configurations, the WWAN component 622 is configured to provide dual-multi-mode connectivity to the network 656. For example, the WWAN component 622 may be configured to provide connectivity to the network 656, wherein the network 656 provides service via GSM and UMTS technologies, or via some other combination of technologies. Alternatively, multiple WWAN components 622 may be utilized to perform such functionality, and/or provide additional functionality to support other non-compatible technologies (i.e., incapable of being supported by a single WWAN component). The WWAN component 622 may facilitate similar connectivity to multiple networks (e.g., a UMTS network and an LTE network).

The network 656 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 624 is configured to connect to the network 656 via the WI-FI access points. Such connections may be secured via various encryption technologies including, but not limited, WI-FI Protected Access ("WPA"), WPA2, Wired Equivalent Privacy ("WEP"), and the like.

The network 656 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 626 is configured to facilitate communications with other devices, such as peripherals, computers, or other computing devices via the WPAN.

The sensor components 608 include a magnetometer 628, an ambient light sensor 630, a proximity sensor 632, an accelerometer 634, a gyroscope 636, and a Global Positioning System sensor ("GPS sensor") 638. It is contemplated that other sensors, such as, but not limited to, temperature sensors or shock detection sensors, also may be incorporated in the computing device architecture 600.

The magnetometer 628 is configured to measure the strength and direction of a magnetic field. In some configurations the magnetometer 628 provides measurements to a compass application program stored within one of the memory components 604 in order to provide a user with accurate directions in a frame of reference including the cardinal directions, north, south, east, and west. Similar measurements may be provided to a navigation application program that includes a compass component. Other uses of measurements obtained by the magnetometer 628 are contemplated.

The ambient light sensor 630 is configured to measure ambient light. In some configurations, the ambient light sensor 630 provides measurements to an application program stored within one the memory components 604 in order to automatically adjust the brightness of a display (described below) to compensate for low-light and high-light environments. Other uses of measurements obtained by the ambient light sensor 630 are contemplated.

The proximity sensor 632 is configured to detect the presence of an object or thing in proximity to the computing device without direct contact. In some configurations, the proximity sensor 632 detects the presence of a user's body (e.g., the user's face) and provides this information to an application program stored within one of the memory components 604 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 632 are contemplated.

The accelerometer 634 is configured to measure proper acceleration. In some configurations, output from the accelerometer 634 is used by an application program as an input mechanism to control some functionality of the application program. For example, the application program may be a video game in which a character, a portion thereof, or an object is moved or otherwise manipulated in response to input received via the accelerometer 634. In some configurations, output from the accelerometer 634 is provided to an application program for use in switching between landscape and portrait modes, calculating coordinate acceleration, or detecting a fall. Other uses of the accelerometer 634 are contemplated.

The gyroscope 636 is configured to measure and maintain orientation. In some configurations, output from the gyroscope 636 is used by an application program as an input mechanism to control some functionality of the application program. For example, the gyroscope 636 can be used for accurate recognition of movement within a 3D environment of a video game application or some other application. In some configurations, an application program utilizes output from the gyroscope 636 and the accelerometer 634 to enhance control of some functionality of the application program. Other uses of the gyroscope 636 are contemplated.

The GPS sensor 638 is configured to receive signals from GPS satellites for use in calculating a location. The location calculated by the GPS sensor 638 may be used by any application program that requires or benefits from location information. For example, the location calculated by the GPS sensor 638 may be used with a navigation application program to provide directions from the location to a destination or directions from the destination to the location. Moreover, the GPS sensor 638 may be used to provide location information to an external location-based service, such as E911 service. The GPS sensor 638 may obtain location information generated via WI-FI, WIMAX, and/or cellular triangulation techniques utilizing one or more of the network connectivity components 606 to aid the GPS sensor 638 in obtaining a location fix. The GPS sensor 638 may also be used in Assisted GPS ("A-GPS") systems. The GPS sensor 638 can also operate in conjunction with other components, such as the processor 602, to generate positioning data for the computing device 600.

The I/O components 610 include a display 640, a touchscreen 642, a data I/O interface component ("data I/O") 644, an audio I/O interface component ("audio I/O") 646, a video I/O interface component ("video I/O") 648, and a camera 650. In some configurations, the display 640 and the touchscreen 642 are combined. In some configurations two or more of the data I/O component 644, the audio I/O component 646, and the video I/O component 648 are combined. The I/O components 610 may include discrete processors configured to support the various interface described below, or may include processing functionality built-in to the processor 602.

The display 640 is an output device configured to present information in a visual form. In particular, the display 640 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 640 is a liquid crystal display ("LCD") utilizing any active or passive matrix technology and any backlighting technology (if used). In some configurations, the display 640 is an organic light emitting diode ("OLED") display. Other display types are contemplated.

The touchscreen 642, also referred to herein as a "touch-enabled screen," is an input device configured to detect the presence and location of a touch. The touchscreen 642 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some configurations, the touchscreen 642 is incorporated on top of the display 640 as a transparent layer to enable a user to use one or more touches to interact with objects or other information presented on the display 640. In other configurations, the touchscreen 642 is a touch pad incorporated on a surface of the computing device that does not include the display 640. For example, the computing device may have a touchscreen incorporated on top of the display 640 and a touch pad on a surface opposite the display 640.

In some configurations, the touchscreen 642 is a single-touch touchscreen. In other configurations, the touchscreen 642 is a multi-touch touchscreen. In some configurations, the touchscreen 642 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 642. As such, a developer may create gestures that are specific to a particular application program.

In some configurations, the touchscreen 642 supports a tap gesture in which a user taps the touchscreen 642 once on an item presented on the display 640. The tap gesture may be used for various reasons including, but not limited to, opening or launching whatever the user taps. In some configurations, the touchscreen 642 supports a double tap gesture in which a user taps the touchscreen 642 twice on an item presented on the display 640. The double tap gesture may be used for various reasons including, but not limited to, zooming in or zooming out in stages. In some configurations, the touchscreen 642 supports a tap and hold gesture in which a user taps the touchscreen 642 and maintains contact for at least a pre-defined time. The tap and hold gesture may be used for various reasons including, but not limited to, opening a context-specific menu.

In some configurations, the touchscreen 642 supports a pan gesture in which a user places a finger on the touchscreen 642 and maintains contact with the touchscreen 642 while moving the finger on the touchscreen 642. The pan gesture may be used for various reasons including, but not limited to, moving through screens, images, or menus at a controlled rate. Multiple finger pan gestures are also contemplated. In some configurations, the touchscreen 642 supports a flick gesture in which a user swipes a finger in the direction the user wants the screen to move. The flick gesture may be used for various reasons including, but not limited to, scrolling horizontally or vertically through menus or pages. In some configurations, the touchscreen 642 supports a pinch and stretch gesture in which a user makes a pinching motion with two fingers (e.g., thumb and forefinger) on the touchscreen 642 or moves the two fingers apart. The pinch and stretch gesture may be used for various reasons including, but not limited to, zooming gradually in or out of a web site, map, or picture.

Although the above gestures have been described with reference to the use of one or more fingers for performing the gestures, other appendages such as toes or objects such as styluses may be used to interact with the touchscreen 642. As such, the above gestures should be understood as being illustrative and should not be construed as being limiting in any way.

The data I/O interface component 644 is configured to facilitate input of data to the computing device and output of data from the computing device. In some configurations, the data I/O interface component 644 includes a connector configured to provide wired connectivity between the computing device and a computer system, for example, for synchronization operation purposes. The connector may be a proprietary connector or a standardized connector such as USB, micro-USB, mini-USB, or the like. In some configurations, the connector is a dock connector for docking the computing device with another device such as a docking station, audio device (e.g., a digital music player), or video device.

The audio I/O interface component 646 is configured to provide audio input and/or output capabilities to the computing device. In some configurations, the audio I/O interface component 646 includes a microphone configured to collect audio signals. In some configurations, the audio I/O interface component 646 includes a headphone jack configured to provide connectivity for headphones or other external speakers. In some configurations, the audio I/O interface component 646 includes a speaker for the output of audio signals. In some configurations, the audio I/O interface component 646 includes an optical audio cable out.

The video I/O interface component 648 is configured to provide video input and/or output capabilities to the computing device. In some configurations, the video I/O interface component 648 includes a video connector configured to receive video as input from another device (e.g., a video media player such as a DVD or BLURAY player) or send video as output to another device (e.g., a monitor, a television, or some other external display). In some configurations, the video I/O interface component 648 includes a High-Definition Multimedia Interface ("HDMI"), mini-HDMI, micro-HDMI, DisplayPort, or proprietary connector to input/output video content. In some configurations, the video I/O interface component 648 or portions thereof is combined with the audio I/O interface component 646 or portions thereof.

The camera 650 can be configured to capture still images and/or video. The camera 650 may utilize a charge coupled device ("CCD") or a complementary metal oxide semiconductor ("CMOS") image sensor to capture images. In some configurations, the camera 650 includes a flash to aid in taking pictures in low-light environments. Settings for the camera 650 may be implemented as hardware or software buttons.

Although not illustrated, one or more hardware buttons may also be included in the computing device architecture 600. The hardware buttons may be used for controlling some operational aspect of the computing device. The hardware buttons may be dedicated buttons or multi-use buttons. The hardware buttons may be mechanical or sensor-based.

The illustrated power components 612 include one or more batteries 652, which can be connected to a battery gauge 654. The batteries 652 may be rechargeable or disposable. Rechargeable battery types include, but are not limited to, lithium polymer, lithium ion, nickel cadmium, and nickel metal hydride. Each of the batteries 652 may be made of one or more cells.

The battery gauge 654 can be configured to measure battery parameters such as current, voltage, and temperature. In some configurations, the battery gauge 654 is configured to measure the effect of a battery's discharge rate, temperature, age and other factors to predict remaining life within a certain percentage of error. In some configurations, the battery gauge 654 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 612 may also include a power connector, which may be combined with one or more of the aforementioned I/O components 610. The power components 612 may interface with an external power system or charging equipment via an I/O component.

EXAMPLE CLAUSES

Example Clause 1. A computer-implemented method, comprising: identifying a policy definition that is configured to cause generation of a computing resource having a first permissions level that is lower than at least one second permissions level; determining that a user account that is assigned the at least one second permissions level has been utilized to generate a service principal that is configured to update the computing resource from having the first permissions level to having the at least one second permissions level; identifying at least one trigger event that is configured to: cause generation of the computing resource in accordance with the policy definition, and cause the service principal to update the computing resource from having the first permissions level to having the at least one second permissions level; determining whether the at least one trigger event is restricted based on the at least one second permissions level; and performing a predefined remedial action in response to determining that the at least one trigger event is not is restricted based on the at least one second permissions level.

Example Clause 2. The computer-implemented method of Example Clause 1, wherein the policy definition is configured to cause generation of the computing resource, based on a resource template, in response to a result of an existence condition associated with the computing resource.

Example Clause 3. The computer-implemented method of Example Clause 1, wherein: the service principal is a second service principal that has been assigned the at least one second permissions level; and the at least one trigger event corresponds to an action being performed with respect to a first service principal that has not been assigned the at least one second permissions level.

Example Clause 4. The computer-implemented method of Example Clause 3, wherein the at least one trigger event corresponds to at least one of: a scheduled event being performed with respect to the first service principal, or a user-defined HTTP callback associated with the first service principal.

Example Clause 5. The computer-implemented method of Example Clause 1, wherein the predefined remedial action includes decommissioning at least one of: the policy definition that is configured to cause generation of the computing resource having the first permissions level; or the service principal that is configured to update the computing resource from having the first permissions level to having the at least one second permissions level.

Example Clause 6. The computer-implemented method of Example Clause 5, wherein the user account that has been utilized to generate the service principal is assigned the at least one second permissions level.

Example Clause 7. The computer-implemented method of Example Clause 1, wherein the performing the predefined remedial action prevents the at least one trigger event from causing at least one of: generation of the computing resource in accordance with the policy definition, or the service principal from updating the computing resource from having the first permissions level to having the at least one second permissions level.

Example Clause 8. A system comprising: one or more processors; and at least one computer storage medium having computer executable instructions stored thereon which, when executed by the one or more processors, cause the system to: identify a policy definition that is configured to cause generation of a computing resource having a first permissions level that is different than a second permissions level; determine that another computing resource that is assigned the second permissions level has been utilized to generate a service principal that is configured to update the computing resource from having the first permissions level to having the second permissions level; identify at least one trigger event that is configured to: cause generation of the computing resource in accordance with the policy definition, and cause the service principal to update the computing resource from having the first permissions level to having the second permissions level; and in response to a determination that the at least one trigger event is not is restricted based on the second permissions level, performing at least one predefined remedial action prior to an occurrence of the at least one trigger event.

Example Clause 9. The system of Example Clause 8, wherein the policy definition is configured to cause generation of the computing resource, based on a resource template, in response to a result of an existence condition associated with the computing resource.

Example Clause 10. The system of Example Clause 8, wherein: the service principal is a second service principal that has been assigned the second permissions level; and the at least one trigger event corresponds to an action being performed with respect to a first service principal that has not been assigned the second permissions level.

Example Clause 11. The system of Example Clause 10, wherein the action being performed with respect to the first service principal corresponds to initiating a user-defined HTTP callback associated with the first service principal.

Example Clause 12. The system of Example Clause 8, wherein the predefined remedial action includes decommissioning at least one service principal that corresponds to the policy definition that is configured to cause generation of the computing resource having the first permissions level.

Example Clause 13. The system of Example Clause 8, wherein the predefined remedial action includes decommissioning the service principal that is configured to update the computing resource from having the first permissions level to having the second permissions level.

Example Clause 14. The system of Example Clause 8, wherein the other computing resource that has been utilized to generate the service principal is a user account that is assigned the second permissions level.

Example Clause 15. The system of Example Clause 8, wherein the performing the predefined remedial action prevents the service principal from updating the computing resource from having the first permissions level to having the permissions level.

Example Clause 16. The system of Example Clause 8, wherein the performing the predefined remedial action prevents the at least one trigger event from causing generation of the computing resource in accordance with the policy definition.

Example Clause 17. A system comprising: one or more processors; and at least one computer storage medium having computer executable instructions stored thereon which, when executed by the one or more processors, cause the system to: identify a first service principal that is configured to perform an automated task in response to a trigger event; identify a second service principal that corresponds to a policy definition that is configured to cause generation of a computing resource having a first permissions level in response to the automated task; identify instructions that are configured to cause generation of a connection between the computing resource and a third service principal that is assigned a second permissions level in response to the automated task; based at least in part on identifying the instructions, perform at least one predefined remedial action prior to an occurrence of the trigger event.

Example Clause 18. The system of Example Clause 17, wherein the trigger event corresponds to at least one of: a scheduled event being performed with respect to the first service principal, or a user-defined HTTP callback associated with the first service principal.

Example Clause 19. The system of Example Clause 18, wherein the performing the at least one predefined remedial action prevents the trigger event from causing at least one of: generation of the computing resource in accordance with the policy definition, or the service principal from updating the computing resource from having the first permissions level to having the at least one second permissions level.

Example Clause 20. The system of Example Clause 17, wherein the policy definition is configured to cause generation of the computing resource, based on a resource template, in response to a result of an existence condition associated with the computing resource.

CONCLUSION

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter. All examples are provided for illustrative purposes and is not to be construed as limiting.

What is claimed is:

1. A computer-implemented method for identifying and mitigating an attack vector in a computing environment, comprising:
   identifying a policy definition that is configured to cause generation of a virtual machine having access to a first permissions level that is lower than at least one second permissions level;
   determining that a user account that is assigned the at least one second permissions level has been utilized to generate, at a first time, a first service principal and a second service principal that includes the policy definition and that is assigned the at least one second permissions level, wherein the second service principal is configured to update the virtual machine from having access to the first permissions level to having access to the at least one second permissions level;
   identifying at least one trigger event associated with the first service principal that is configured to:
   cause the second service principal to:
      generate, at a second time, the virtual machine in accordance with the policy definition, and
      update the virtual machine from having access to the first permissions level to having access to the at least one second permissions level by associating the virtual machine with a third service principal at the second time;
   determining whether that the at least one trigger event is not restricted based on the at least one second permissions level; and
   mitigating the attack vector by performing a predefined remedial action in response to determining that the at least one trigger event is not restricted based on the at least one second permissions level prior to an occurrence of the at least one trigger event.

2. The computer-implemented method of claim 1, wherein the policy definition is configured to cause generation of the virtual machine, based on a resource template, in response to a result of an existence condition associated with the virtual machine.

3. The computer-implemented method of claim 1, wherein the at least one trigger event corresponds to an action being performed with respect to the first service principal that has not been assigned the at least one second permissions level.

4. The computer-implemented method of claim 3, wherein the at least one trigger event corresponds to at least one of: a scheduled event being performed with respect to the first service principal, or a user-defined HTTP callback associated with the first service principal.

5. The computer-implemented method of claim 1, wherein the predefined remedial action includes decommissioning at least one of:
   the policy definition that is configured to cause generation of the virtual machine having the first permissions level; or
   the second service principal that is configured to update the virtual machine from having access to the first permissions level to having access to the at least one second permissions level.

6. The computer-implemented method of claim 1, wherein the performing the predefined remedial action prevents the at least one trigger event from causing at least one of:
   generation of the virtual machine in accordance with the policy definition, or
   the second service principal from updating the virtual machine from having access to the first permissions level to having access to the at least one second permissions level.

7. The method of claim 1, wherein an individual service principal is an automated component of the computing environment that is distinct from the user account.

8. The method of claim 1, wherein the policy definition is a predetermined condition that, when satisfied, causes the second service principal to execute an action within the computing environment.

9. A system for identifying and mitigating an attack vector in a computing environment, comprising:
   one or more processors; and
   at least one computer storage medium having computer executable instructions stored thereon which, when executed by the one or more processors, cause the system to:
   identify a policy definition that is configured to cause generation of a virtual machine having access to a first permissions level that is different than a second permissions level;
   determine that a user account that is assigned the second permissions level has been utilized to generate, at a first time, a first service principal and a second service principal that includes the policy definition and that is assigned the second permissions level, wherein the second service principal is configured to update the virtual machine from having access to the first permissions level to having access to the second permissions level;
   identify at least one trigger event associated with the first service principal that is configured to:
   cause the second service principal to:
      generate, at a second time, the virtual machine in accordance with the policy definition, and
      update the virtual machine from having access to the first permissions level to having access to the second permissions level by associating the virtual machine with a third service principal at the second time;
   determine that the at least one trigger event is not restricted based on the second permissions level; and
   in response to a determination that the at least one trigger event is not restricted based on the second permissions level, mitigating the attack vector by performing at least one predefined remedial action prior to an occurrence of the at least one trigger event.

10. The system of claim 9, wherein the policy definition is configured to cause generation of the virtual machine, based on a resource template, in response to a result of an existence condition associated with the virtual machine.

11. The system of claim 9, where the at least one trigger event corresponds to an action being performed with respect to the first service principal that has not been assigned the second permissions level.

12. The system of claim 11, wherein the action being performed with respect to the first service principal corresponds to initiating a user-defined HTTP callback associated with the first service principal.

13. The system of claim 9, wherein the predefined remedial action includes decommissioning the second service principal that corresponds to the policy definition that is configured to cause generation of the virtual machine having the first permissions level.

14. The system of claim 9, wherein the predefined remedial action includes decommissioning the second service principal that is configured to update the virtual machine from having access to the first permissions level to having access to the second permissions level.

15. The system of claim 9, wherein the performing the predefined remedial action prevents the second service principal from updating the virtual machine from having access to the first permissions level to having access to the second permissions level.

16. A system of claim 9, wherein the performing the predefined remedial action prevents the at least one trigger event from causing the second service principal to generate, at the second time, the virtual machine in accordance with the policy definition.

17. A computer readable storage medium having computer executable instructions stored thereon which, when executed by a system, cause the system to:
    identify a policy definition that is configured to cause generation of a virtual machine having access to a first permissions level that is lower than a second permissions level;
    determine that a user account that is assigned the second permissions level has been utilized to generate, at a first time, a first service principal and a second service principal that includes the policy definition and that is assigned the second permissions level, wherein the second service principal is configured to update the virtual machine from having access to the first permissions level to having access to the second permissions level;
    identify at least one trigger event associated with the first service principal that is configured to:
    cause the second service principal to:
        generate, at a second time, the virtual machine in accordance with the policy definition, and
        update the virtual machine from having access to the first permissions level to having access to the second permissions level by associating the virtual machine with a third service principal at the second time;
    determine that the at least one trigger event is not restricted based on the second permissions level; and
    in response to determining that the at least one trigger event is not restricted based on the second permissions level, perform at least one predefined remedial action prior to an occurrence of the trigger event.

18. The computer readable storage medium of claim 17, wherein the trigger event corresponds to at least one of: a scheduled event being performed with respect to the first service principal, or a user-defined HTTP callback associated with the first service principal.

19. The computer readable storage medium of claim 18, wherein the performing the at least one predefined remedial action prevents the trigger event from causing at least one of:
    the second service principal from generating, at the second time, the virtual machine in accordance with the policy definition, or
    the second service principal from updating the virtual machine from having access to the first permissions level to having access to the second permissions level.

20. The computer readable storage medium of claim 17, wherein the policy definition is configured to cause generation of the virtual machine, based on a resource template, in response to a result of an existence condition associated with the virtual machine.

* * * * *